(12) United States Patent
Bachner et al.

(10) Patent No.: US 7,754,133 B2
(45) Date of Patent: Jul. 13, 2010

(54) ROTATIONAL MOLDING PROCESS AND PRODUCT USING SEPARATION SHEET

(75) Inventors: Mark Bachner, Hudson, OH (US); Paul Bachman, Aurora, OH (US); Mike McMinn, Cuyahoga Falls, OH (US); Gary Bartlett, Cuyahoga Falls, OH (US); Eric Selner, Hudson, OH (US); Kevin Sandieson, Stow, OH (US)

(73) Assignee: The Little Tikes Company, Hudson, OH (US)

( * ) Notice: Subject to any disclaimer, the term of this patent is extended or adjusted under 35 U.S.C. 154(b) by 337 days.

(21) Appl. No.: 11/771,154

(22) Filed: Jun. 29, 2007

(65) Prior Publication Data

US 2009/0001249 A1    Jan. 1, 2009

(51) Int. Cl.
*B28B 1/02* (2006.01)
*B28B 1/20* (2006.01)
*B28B 1/44* (2006.01)
*B29C 65/00* (2006.01)

(52) U.S. Cl. .................. 264/310; 264/248; 264/311; 264/312

(58) Field of Classification Search .............. 264/248, 264/310–312, 245, 246, 255, 301; 249/105, 249/128, 131, 137
See application file for complete search history.

(56) References Cited

U.S. PATENT DOCUMENTS

| 4,894,004 | A | | 1/1990 | Brault | |
|---|---|---|---|---|---|
| 4,925,151 | A | * | 5/1990 | Gray | 249/65 |
| 4,938,675 | A | | 7/1990 | Contreras et al. | |
| 4,938,906 | A | | 7/1990 | Brault | |
| 5,225,214 | A | * | 7/1993 | Filion | 425/434 |
| 5,234,653 | A | | 8/1993 | Buzzoni et al. | |
| 5,316,715 | A | * | 5/1994 | Gray | 264/245 |
| 6,126,881 | A | | 10/2000 | Eckert | |
| 6,383,437 | B1 | * | 5/2002 | Grieve | 264/246 |

* cited by examiner

*Primary Examiner*—Khanh Nguyen
*Assistant Examiner*—Matthew Hoover
(74) *Attorney, Agent, or Firm*—Renner, Otto, Boisselle & Sklar LLP

(57) ABSTRACT

A product and method where a multi-colored product is rotationally molded with no or essentially no blending of the colors. A separation sheet is positioned in the mold to separate relatively adjacent portions of the mold cavity that contain differently colored resins. The separation sheet acts as a barrier to prevent the differently colored resins from blending during the molding process. During the molding process, the molten resins may fuse to opposite sides of the separation sheet, or the separation sheet may melt and disperse, all or in part, within the mold while maintaining a distinct color difference between the differently colored portions of the molded product.

10 Claims, 9 Drawing Sheets

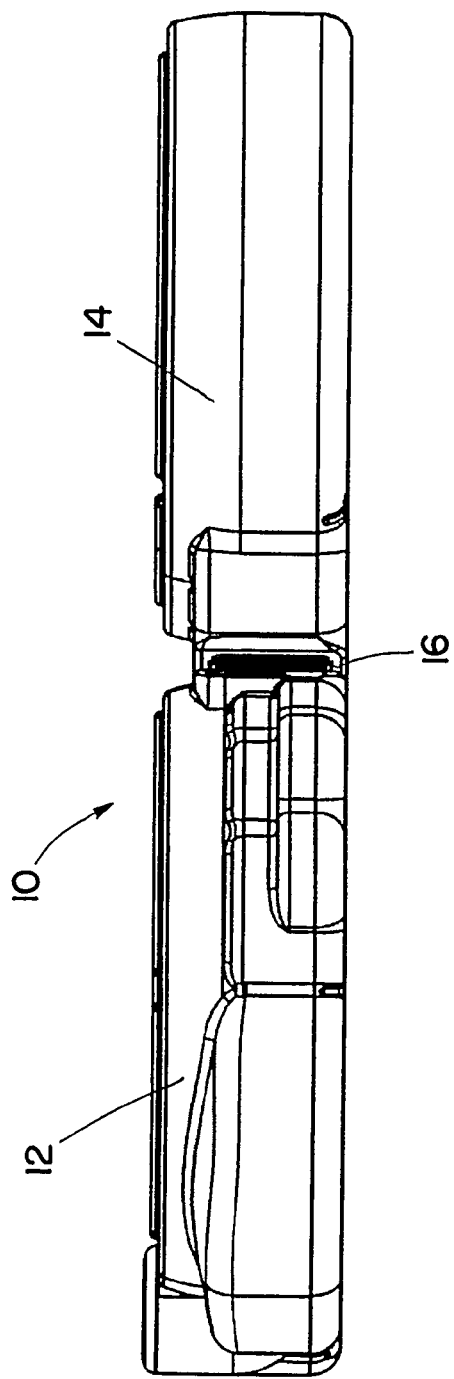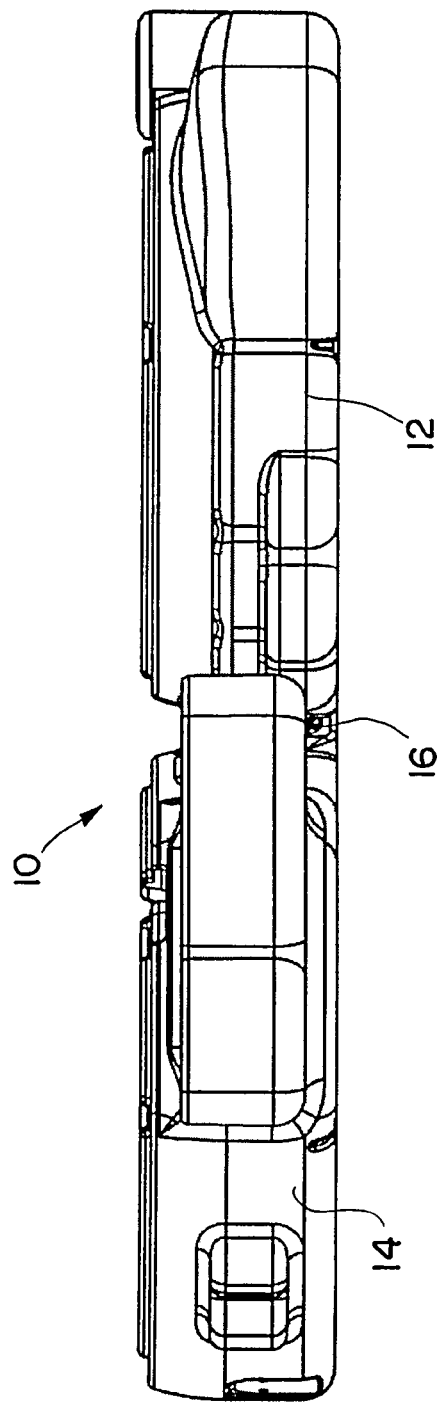

ROTATIONAL MOLDING PROCESS AND PRODUCT USING SEPARATION SHEET

The invention herein described relates generally to the field of rotational molding, and more particularly to a rotational molding product and process wherein a separation sheet is used to separate differently colored resins.

BACKGROUND OF THE INVENTION

Rotational molding (also commonly called rotomolding) is a method of manufacture for primarily large, hollow or partial shell-shaped plastic objects. This process utilizes a shell mold having a cavity into which is placed a powdered (optionally colored and sometimes liquid) plastic resin. The mold is then closed and placed in an oven where it is heated and rotated about one or more axes. Rotation of the mold can include either complete revolutions about two axes or complete revolutions about a single axis with partial revolutions about a second axis. In both cases, the two axes of rotation typically are mutually perpendicular. The heat causes the resin to melt against the heated inside surface of the mold. The melted resin flows within the cavity to form a viscous membrane conforming to the mold's inner surface. The mold (and the plastic inside) is then cooled while rotation continues, causing the resin to harden in the shape of the cavity.

In the past, multi-colored rotationally molded products typically would be formed by separately rotationally molding single color parts and then fastening the parts together to form an integral structure. Multi-colored products also have been rotationally molded in a single mold, particularly in the kayak industry. Rotational molding of two-color kayaks can be done because the molding process involves rotating the mold on only one axis, rather than two axes. The colors, however, are not clearly separated as there is some blending that occurs in the area where the different colors of pigmented resins mix in the mold.

Applicants' assignee also has rotationally molded two-color products, in particular two-color slides, about two rotational axes by controlling the rotation of the mold during the molding process. The two colors of pigmented resin, however, were blended.

While the blending of the colors may be desirable for some applications, for others it is not. In these latter instances, the manufacturer would be left with molding the differently colored parts separately and then fastening them together to form the finished product.

SUMMARY OF THE INVENTION

The present invention provides a product and method where a multi-colored product is rotationally molded with no or essentially no blending of the colors. Moreover, this can be accomplished even when using a multi-axis rotational molding process. In particular, a separation sheet is positioned in the mold to separate relatively adjacent portions of the mold cavity that contain differently colored resins. The separation sheet acts as a barrier to prevent the differently colored resins from blending during the molding process. During the molding process, the molten resins may fuse to opposite sides of the separation sheet, or the separation sheet may melt and disperse, all or in part, within the mold while maintaining a distinct color difference between the differently colored portions of the molded product.

Therefore, according to one aspect of the invention, a rotationally molded, multi-colored product is provided comprising first and second portions of different colors, with each portion having been fused to a separation sheet during rotational molding, whereby the molded product has a unitary structure.

According to one embodiment of the multi-colored product, the separation sheet has a peripheral portion that protrudes beyond relatively adjacent exterior surfaces of the first and second portions.

According to another aspect of the invention, a method of rotationally molding a multi-colored product includes the steps of positioning a separation sheet in a mold cavity of a rotational mold, closing the mold with the separation sheet separating adjacent portions of the mold cavity that contain differently colored resins, rotating and heating the mold to melt the resins and cause the melted resins to flow within the cavity portions to form viscous membranes conforming to the mold's inner surface, and further to cause the viscous membranes to fuse with the separation sheet, cooling the mold to cause the molten resins to harden and form respective portions of the product in the shape of the respective portions of the mold cavity, and further to form fusion bonds between the respective portions of the product and the separation sheet, thereby to form a molded product having a unitary structure.

According to an embodiment of the method, the rotational mold includes mold parts forming the mold cavity therebetween, and the positioning step includes inserting the separation sheet into a groove in at least one of the mold parts.

According to an embodiment of the method, each mold part has a groove for receiving a peripheral edge portion of the separation sheet.

According to an embodiment of the method, the groove is continuous around the mold cavity.

According to an embodiment of the method, the separation sheet is a plastic sheet.

According to an embodiment of the method, the separation sheet is made of polyethylene, in particular HDPE, and the adjacent portions of the product are made of polyethylene, more particularly LLDPE. The invention, however, may be applied to other rotationally molded materials.

According to an embodiment of the method, the separation sheet is 0.100-0.125 inches thick.

According to an embodiment of the method, the mold is rotated about one or more axes of rotation.

According to a further aspect of the invention, a method of rotationally molding a multi-colored product includes the steps of providing a mold for a product to be molded, inserting a separation sheet into the mold, wherein the separation sheet has a first side and a second side opposite the first side, pouring a first resin having a first color into the mold adjacent the first side of the separation sheet, pouring a second resin having a second color different from the first color into the mold adjacent the second side of the plastic sheet, and molding the product, wherein the first resin and the second resin do not mix during the molding process.

In a particular embodiment, the molding the product includes maintaining the integrity of the separation sheet until such time as the first resin and the second resin have coated the mold, wherein the first and second colors are separated within the mold without mixing, then melting the separation sheet, and dispersing the separation sheet within the mold while maintaining the color separation.

According to still another aspect of the invention, a rotational mold for use in a rotational molding process includes a first mold component, a second mold component which is mated to the first mold component to define a mold cavity, a receptor within the first mold component for receiving a separation sheet such that the separator sheet will divide the mold cavity into a first mold compartment and a second mold compartment for containing and separating respective resins of different color during the molding process.

According to an embodiment of the mold, the receptor is a groove within the first mold component for receiving a peripheral edge portion of the separation sheet.

According to an embodiment of the mold, each mold component has a groove for receiving a peripheral edge portion of the separation sheet.

According to an embodiment of the mold, the groove is continuous around the mold cavity.

The foregoing and other features of the invention are hereinafter fully described and particularly pointed out in the claims, the following description and annexed drawings setting forth in detail certain illustrative embodiments of the invention. These embodiments are merely indicative, however, of examples of the various ways in which the principles of the invention may be employed.

BRIEF DESCRIPTION OF THE DRAWINGS

In the Annexed Drawings:

FIG. 2 is a side elevational view of the rotationally molded product of FIG. 1, looking from the line X-X';

FIG. 3 is a side elevational view of the rotationally molded product of FIG. 1 looking from the line Y-Y';

DETAILED DESCRIPTION

Figure 1:
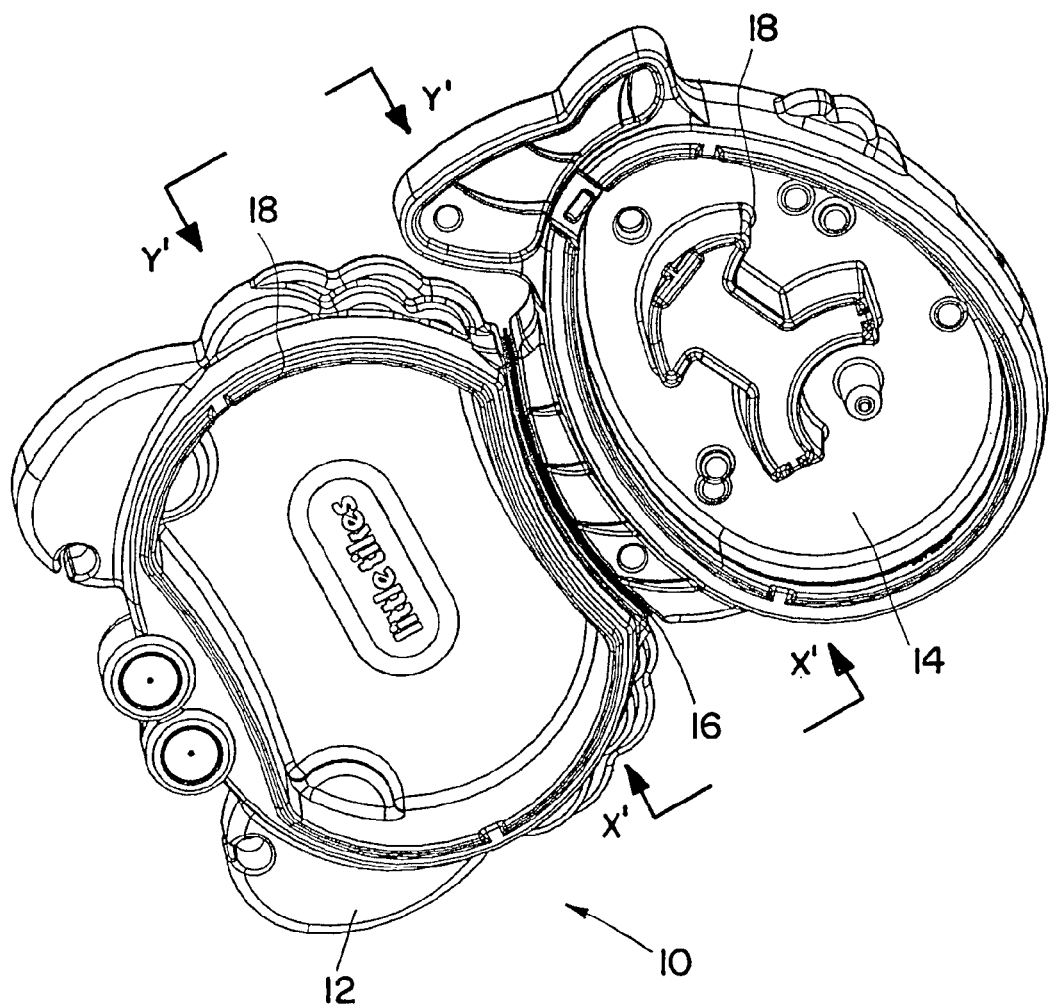
FIG. 1 is a perspective view of an exemplary multi-colored, rotationally molded product in accordance with the present invention.

Referring now in detail to the drawings, and initially to FIG. 1, a rotationally molded, multi-colored product 10 is shown from a top view. The product has a first portion 12 and second portion 14. The first and second portions are of different colors, with no overlap or blending of the colors at their boundary. A separation sheet 16 is between the first and second portions. During the molding process, the separation sheet may fuse to the first and second portions to produce a unitary structure.

The exemplary product is a child's toy, and more particularly a combination sandbox and water table. As seen in FIG. 1, the first portion 12 is a sand box in the shape of a crab, and as such it is colored red in this example. The second portion 14 is a water table in the shape of a fish, and as such it is colored blue in this example. The first and second portions 12 and 14 may have numerous features 18 that improve the aesthetics and/or offer various play options. Such features may be created as part of the molding process and may vary without departing from the invention. As further described below, the crab and fish are rotationally molded together as single, unitary part. To provide maximum emphasis of the sand/water distinction, the colors of the crab and fish do not blend or mix at their boundary during the molding process.

A product according to the invention is not limited to the crab-fish example, but may be any rotationally molded, multi-colored object. Furthermore, any colors for each portion may be used. The multi-colored product also may include more than two colored portions. In such a case, a separation sheet 16 is provided at each color boundary, such that there is no mixing or blending of any two adjacent colors during the molding process.

Figure 4:
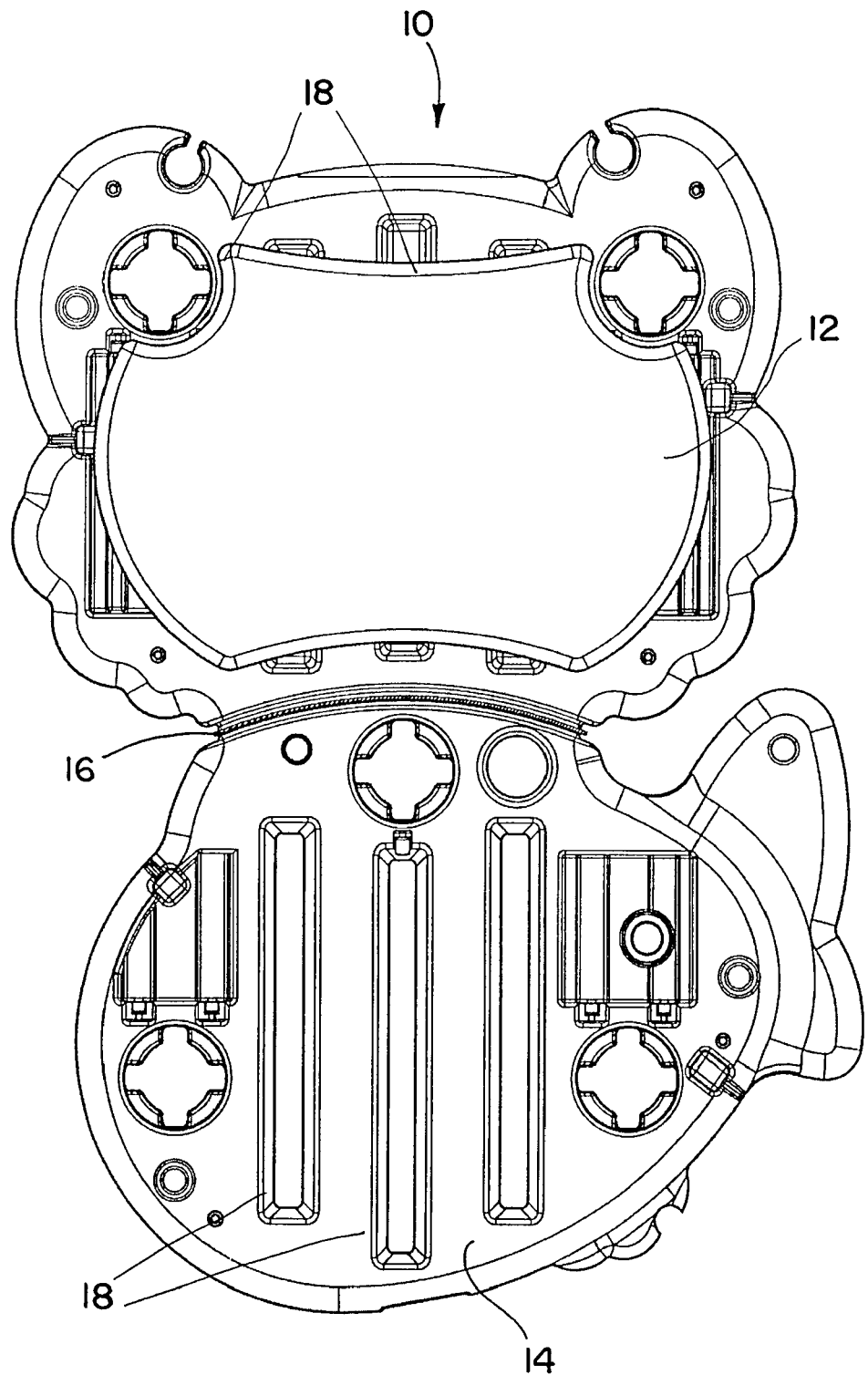
FIG. 4 is a bottom view of the rotationally molded product of FIG. 1.
Figure 5:
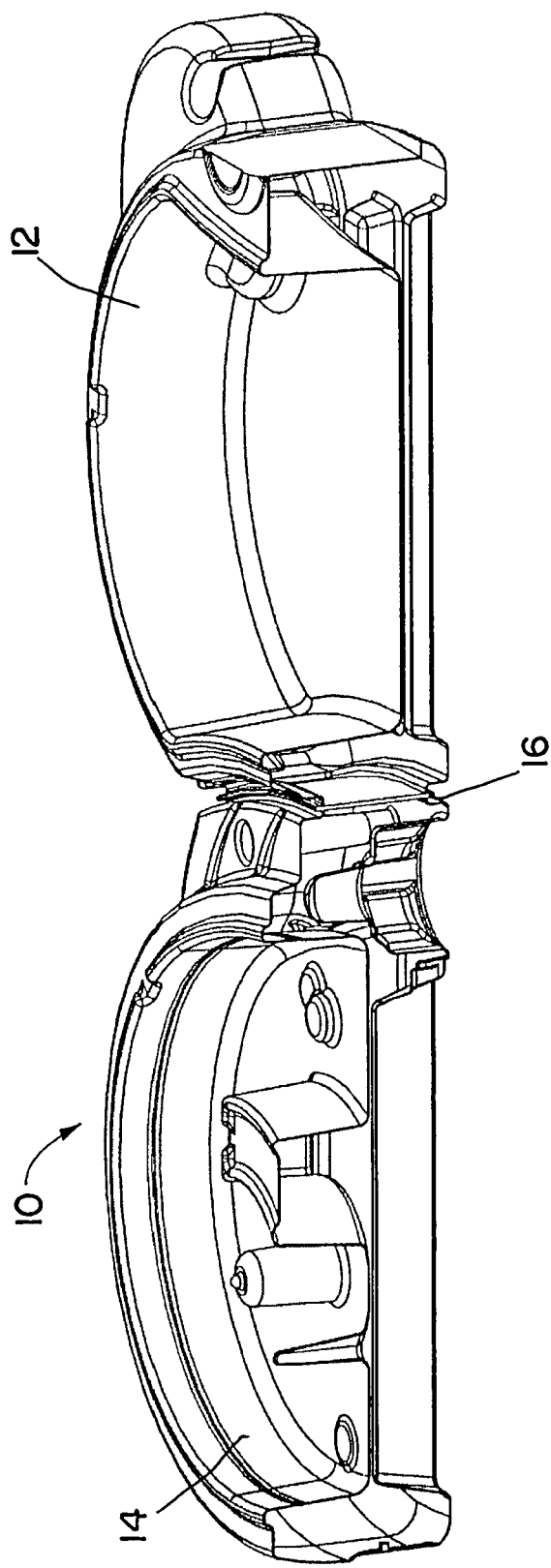
FIG. 5 is a cutaway view of the rotationally molded product of FIG. 1.

As seen in FIGS. 2-4, the first portion 12 (the crab) and the second portion 14 (the fish) are separated by separation sheet 16 such that the colors of the first and second portions do not or overlap or blend at their boundary. This can be seen in greater detail in FIG. 5. In the illustrated embodiment, the separation sheet 16 is substantially planar and separates the first and second portions 12 and 14 along their entire boundary. In this example, the separation 16 has a slight curvature commensurate with the boundary of the first and second portions. In other products, separation sheet 16 may be flat or possess multiple curvatures, depending on the configuration at the boundary between the differently colored portions. To accommodate these variations, the separation sheet 16 preferably is made of a flexible plastic material. Such materials are known to those skilled in the art, such as HDPE, MDPE, LLDPE, ABS, PS, PP, PVC, etc. The separation sheet may have a color matching one of the portions, may be a third color, or may be substantially clear. A sheet thickness of 0.100"-0.125" has been found to work well in many situations, although other thicknesses may be appropriate depending upon the circumstances. The separation sheet usually will have a thickness less than 0.20 inch.

Figure 6:
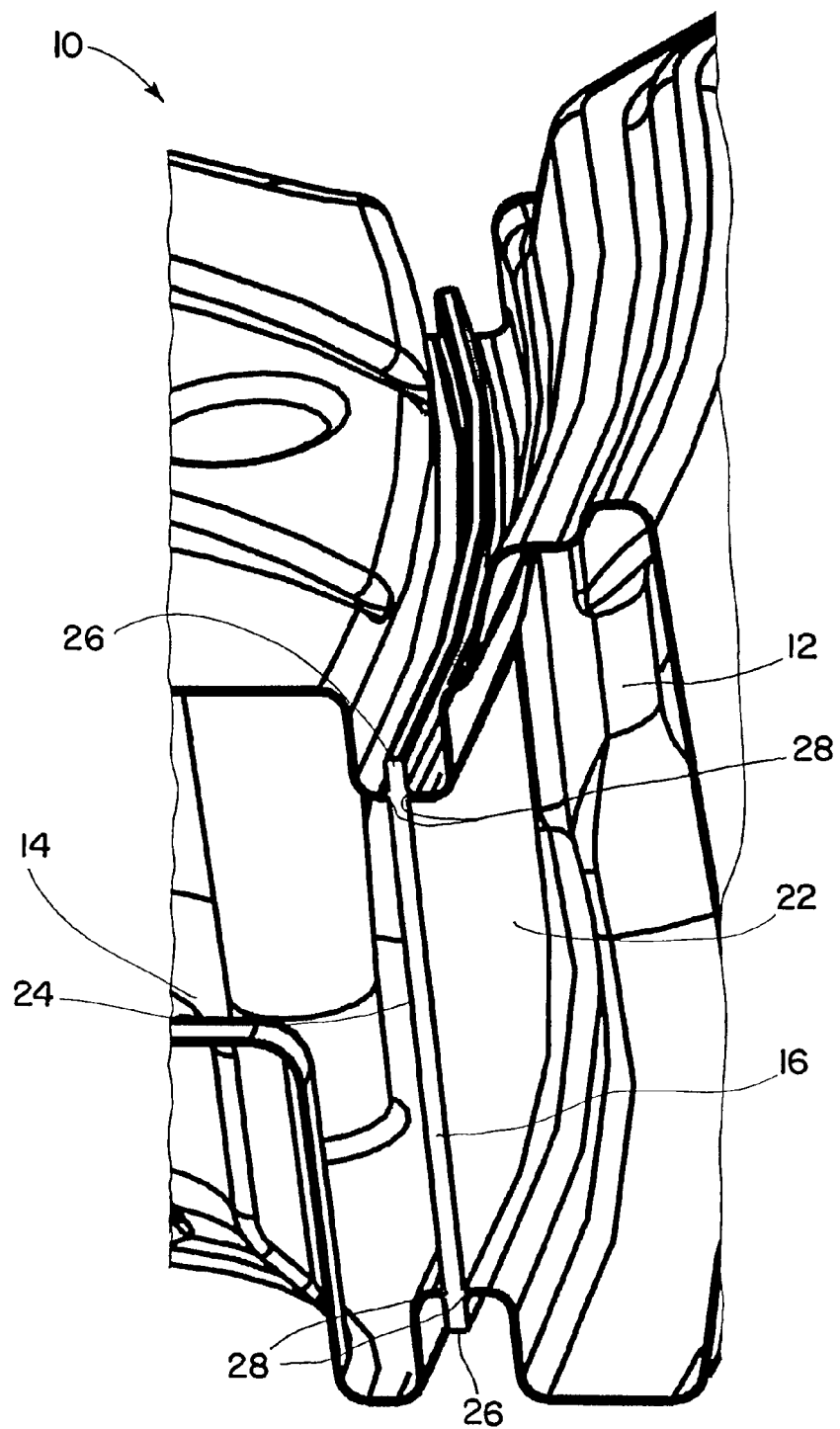
FIG. 6 is an enlarged fragmentary view of the boundary area between two colored portions of the rotationally molded product of FIG. 1.
Figure 7:
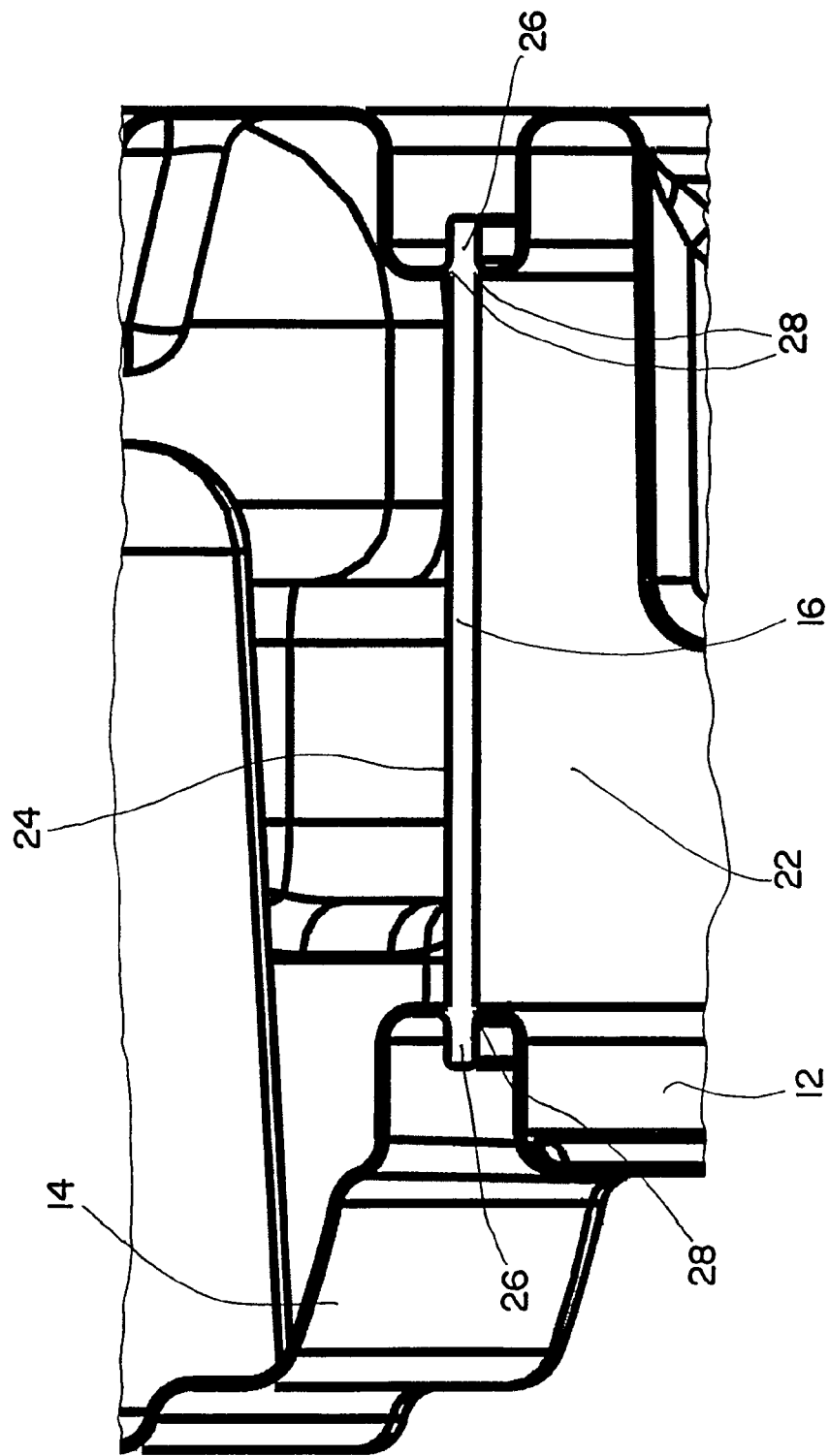
FIG. 7 is a further enlarged cross-sectional view of the boundary area of FIG. 6.

FIGS. 6 and 7 provide close-up views of the boundary between the first and second portions 12 and 14. At the boundary, the separation sheet has side surfaces 22 and 24. The separation sheet 16 is interposed between adjacent surfaces of the first and second portions. During the molding process, the separation sheet may fuse to one or both of the juxtaposed surfaces. Separation sheet 16 also has peripheral portion(s) 26 that may protrude beyond adjacent exterior surfaces of the first and second portions. As further discussed below, the peripheral portion(s) is received in grooves in the mold cavities. The protrusions may remain in the final product or be removed, such as by cutting or sanding, during a post-production process. During the molding process, separation sheet 16 also may form lips 28 against exterior surfaces where the boundary begins.

Figure 8:
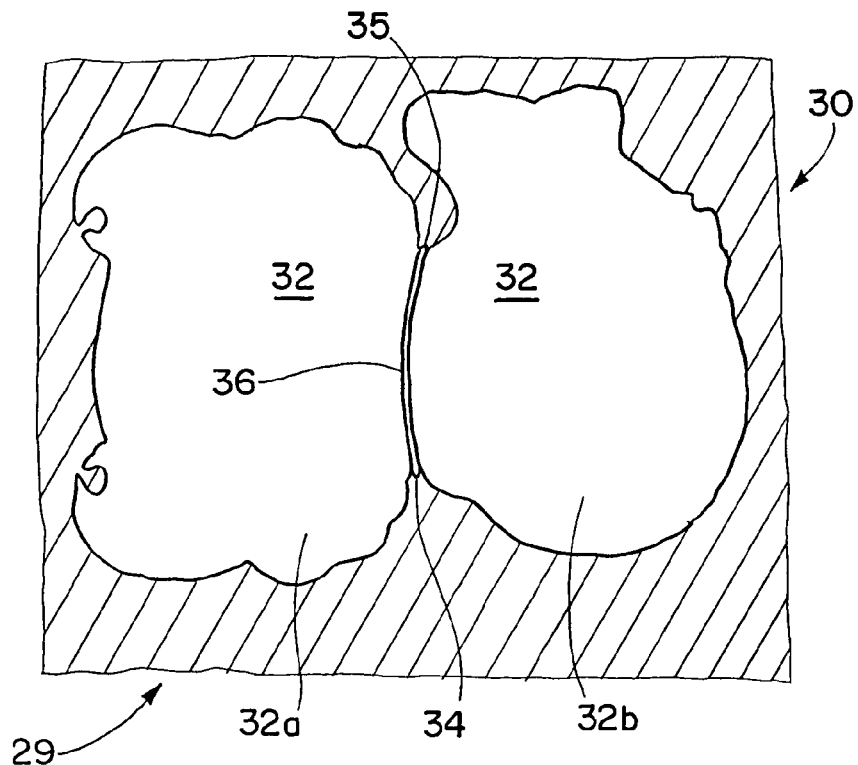
FIG. 8 is an illustration of a rotational mold which may be used in accordance with the present invention.

FIG. 8 depicts a portion of a mold 29 for rotationally molding a multi-colored product in accordance with the present invention. In particular, a first mold component 30 is shown. It will be appreciated by those skilled in the art that the mold also has a second mold component (not shown) of substantially the same shape which would mate with and be secured to the first mold component. The mated mold parts define a mold cavity 32 therebetween. In the context of this example, the mold cavity is substantially in the shape of the crab-fish product to be molded. Typically, as will be recognized by those skilled in the art, the mold would have protrusions and recesses as necessary to form the features 18 (see FIGS. 1-4) into the final product. For sake of brevity, those features are not shown in FIG. 8. In addition, although the mold cavity has the crab-fish shape, the mold cavity may take on any shape which would conform to a given product to be molded.

Figure 9:
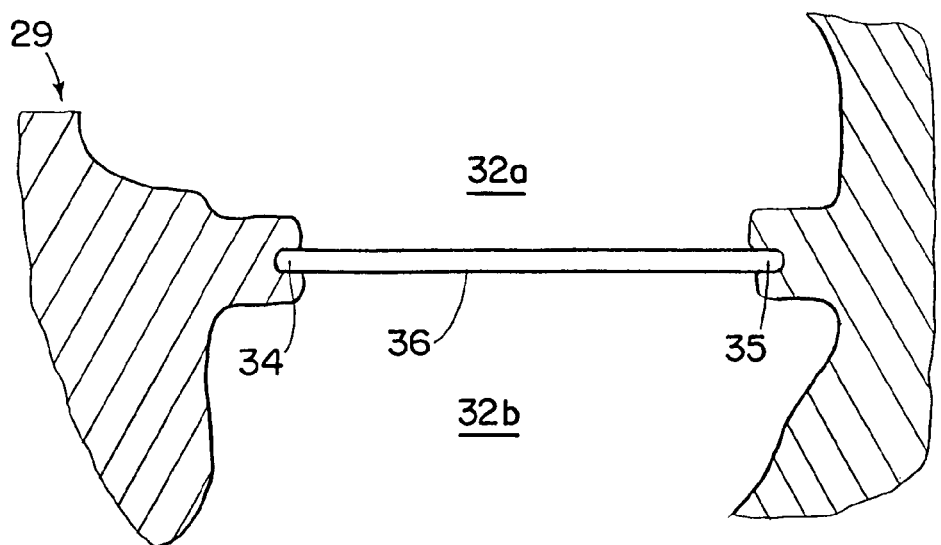
FIG. 9 is an illustration of the portion of the rotational mold of FIG. 8 showing receipt of a separation sheet in accordance with the present invention.

The mold 29 has a receptor for receiving the separation sheet. In the illustrated exemplary embodiment, as depicted in FIGS. 8 and 9, the first mold component 30 may have a capture device 34, such as a recess that may be in the form of a groove 36 that may extend continuously or discontinuously from the parting face at one side of the mold cavity to the parting face at the opposite side of the mold cavity. The groove forms a slot for receiving a peripheral edge portion of the separation sheet 16 preferably with a tight or snug fit. In the context of the figures, separation sheet 16 would extend upward perpendicularly from the page.

The groove 36 may be sufficient to secure and hold the separation sheet during the molding process. The second mold component preferably also has a complementary groove. Those skilled in the art will appreciate that other mechanisms may be used to hold the separation sheet in between the mold parts without departing from the scope of the invention. For example, mechanical fasteners, locating pins, adhesives, etc. may be used.

When in place, the separation sheet 16 divides the mold cavity 32 into two adjacent portions, a first portion 32a and a second portion 32b. In this example, portion 32a represents the crab and portion 32b represents the fish.

A method of rotationally molding the crab-fish product will now be described. As stated previously, the crab-fish product represents an example, and the following method may apply to any rotationally molded, multi-colored product.

The separation sheet 16 first may be positioned within the mold cavity 32 in the first mold component 30 of the rotational mold. The separation sheet may be held in place by positioning it within the groove 36 in each mold part, or by some other adequate securing mechanism. In place, the separation sheet separates the mold cavity into adjacent portions 32a, 32b. A resin of a first color is placed within cavity 32a, and a resin of a second color is placed within cavity 32b. In this example, the first resin is red for the crab, and the second resin is blue for the fish. Colored resins for use in rotational molding processes are well known in art, and may be in a powder or liquid form. Exemplary resins include HDPE, MDPE, LLDPE, ABS, PS, PP, PVC, etc. The mold may then be closed with the second mold component, which may have a complementary set of recesses and groove.

The product is then subjected to a rotational molding process. The mold may be rotated about one, two or three axes and heated to melt the resins and cause the melted resins to flow within the cavity portions to form viscous membranes, which conform to the mold's inner surface. The viscous membranes also may fuse with the separation sheet. The two resins, however, remain segregated throughout the molding process, and neither mix nor blend, not even at the boundary created by the separation sheet. The rotation may include complete revolutions about only one axis of rotation, or additionally may include partial or complete revolutions about a second axis of rotation.

The mold then is cooled, which causes the molten resins to harden and form the portions of the product in the shape of the respective portions of the mold cavity. The resins further form fusion bonds between the respective portions of the product and the separation sheet, thereby forming a molded, multi-colored product with a unitary structure. Because in this embodiment the separation sheet fuses to the resins, for aesthetic reasons the color of the separation sheet may match the color of either the first resin or second resin. Alternatively, the separation sheet may be a third color, or substantially clear.

In an alternative embodiment, the separation sheet does not fuse with the resins. Rather, the separation sheet maintains its integrity and separates the first and second resins until such time as the resins have coated the mold. At this point, the resins are substantially fixed in position and are no longer able to mix or blend. The separation sheet may then melt and disperse within the mold while the color separation is maintained while the resins bond directly to one another.

Figure 10:
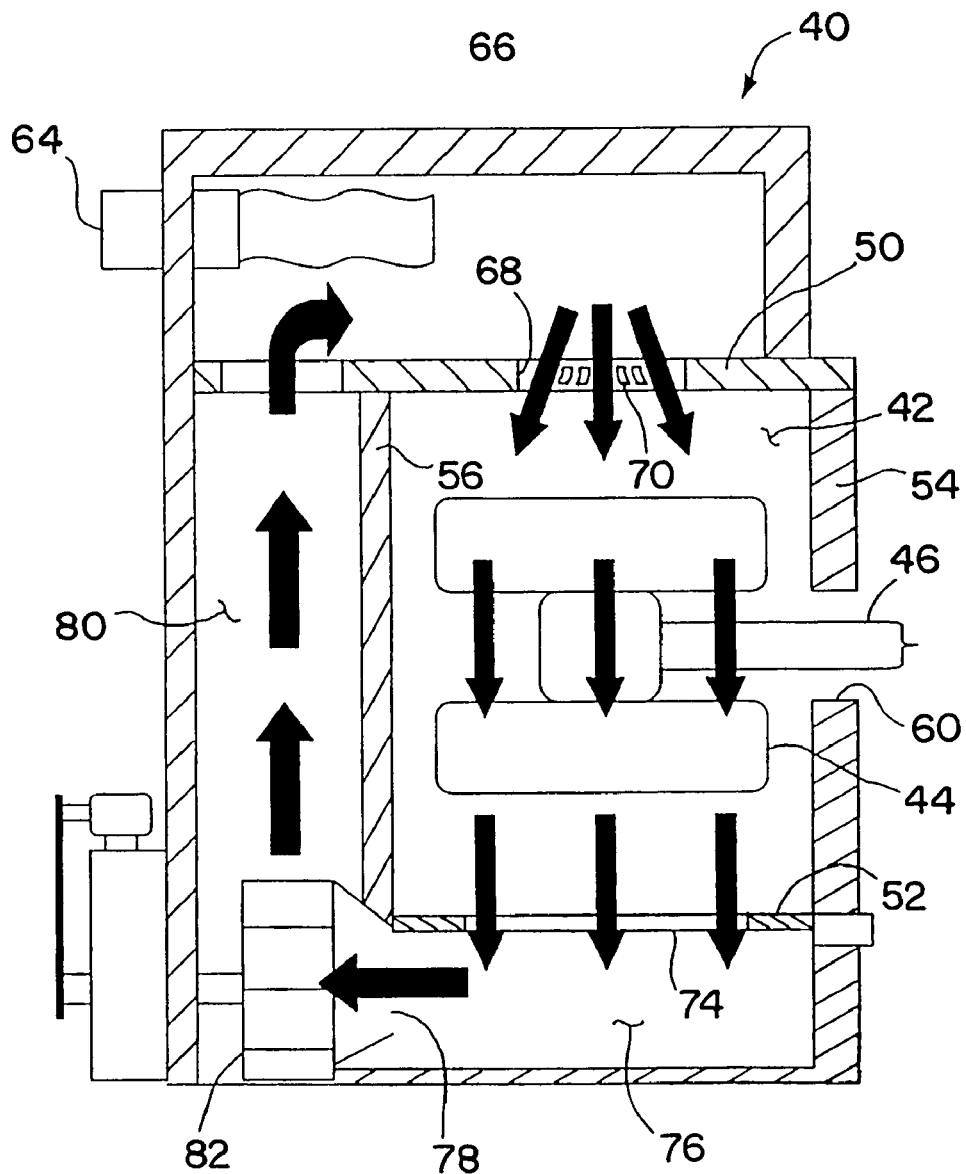
FIG. 10 is a schematic illustration of a hot-air recirculating rotational molding oven which may be used with the present invention.

The present invention may be practiced using any conventional rotational molding apparatus. An example of such an apparatus is depicted in FIG. 10. A rotational molding oven 40 includes a heating chamber 42 through which a heated gas, such as heated air, is passed to heat a rotational mold 44 that is supported on an arm 46. The arm 46 may be a conventional arm configured to rotate the mold about two, usually perpendicular, axes. The arm can be part of a turret used to cycle one or more molds through one or more stations including a heating station at which the oven 40 is located.

Figure 11:
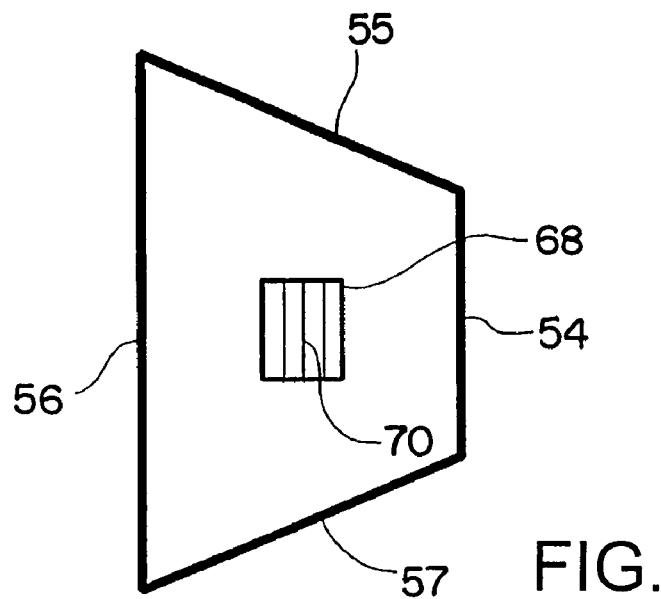
FIG. 11 is a top view of the heating chamber of the oven of FIG. 10.
Figure 12:
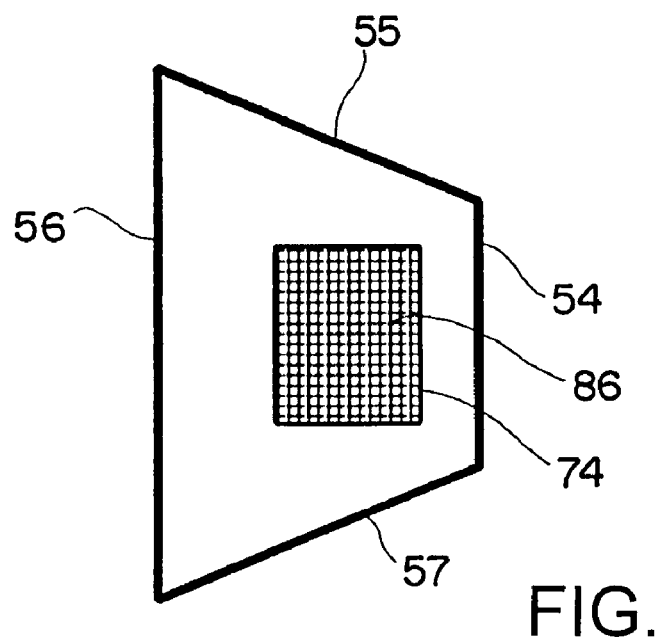
FIG. 12 is a bottom view of the heating chamber of the oven of FIG. 10.

The heating chamber 42 has a top wall 50, a floor 52, and side walls 54-57 (FIGS. 11 and 12). In the case of a turret-type system, where the arm 46 extends radially from a hub of a turret, the walls 54 and 56 are radially opposed and can be referred to as radially inner and outer side walls. The walls 55 and 57 are circumferentially opposed and each has a door that can be opened to permit passage of the mold into and out of the heating chamber as the turret (or a cart-type system) is rotated. In the illustrated embodiment, as is typical, the doors form the walls 55 and 57, and the doors can be moved along tracks on the floor to open and close the sides of the oven. In order to accommodate passage of the arm 46, the radially inner wall 54 is bifurcated by a horizontal slot 60 though which the arm can pass as the turret (or cart) is rotated.

A burner 64 is provided in a combustion chamber 66 located in the upper part of the oven 40. The burner heats the air that is then directed into the heating chamber 42 through an inlet opening 68. The inlet opening can be provided with directional louvers 70 as shown in FIG. 11 to spread the heated air across the mold 44 located therebeneath. The inlet opening can be generally centrally disposed in the top wall 50 of the heating chamber 42, as shown in FIG. 11.

At the bottom of the heating chamber 42, the floor 52 has an outlet opening 74 through which the heated air passes from the heating chamber to a bottom plenum 76 located beneath the heating chamber. The plenum 76 has a side outlet 78 that is connected to a return passage 80 that extends to the combustion chamber and includes a fan 82 (e.g. a blower) for circulating the heated air through the oven. An exhaust fan (not shown) can be provided for exhausting hot combustion gasses, in particular carbon monoxide, from the heating chamber through an oven stack.

The outlet opening 74 may be covered by an open mesh grid 86, e.g. a grating or screen. The outlet opening extends over at least about 25% of the area of the floor 52, and preferably has a cross-sectional area greater than that of the inlet opening 68. The larger area outlet opening, which can be adjustable in size, provides for better circulation of the heated air around the mold. As seen in FIG. 12, the outlet opening is centrally disposed between the side walls (doors) 55 and 57 of the heating chamber and, more generally, is inwardly spaced away from the side walls 55-57 of the heating chamber.

In operation and as is evident from the foregoing description, air is recirculated through the oven 40 and combustion chamber 66 by the fan 82. Air heated by the burner 64 is directed into the heating chamber 42 through the inlet opening 68 while the louvers 70 function to spread the heated air across the top of the heating chamber for downward flow under downdraft conditions. The heated air exits from heating chamber into the plenum 76 through the large outlet opening 74 in the floor 52 of the heating chamber. The air is drawn from the bottom plenum by the fan and directed back to the burner where it is reheated.

As will be appreciated by those skilled in the art, other rotational molding apparatuses may be used with the present invention.

While the separation sheet is shown as a nonforaminous sheet, the separation sheet may have one or more openings spaced inwardly from the peripheral edges. The spacing should be such to prevent resin from one mold part from flowing into the other mold part.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of rotationally molding a multi-colored product, comprising the steps of:
    positioning a separation sheet in a mold cavity of a rotational mold;
    closing the mold with the separation sheet separating adjacent portions of the mold cavity that contain differently colored resins;
    rotating and heating the mold to melt the resins and cause the melted resins to flow within the cavity portions to form viscous membranes conforming to the mold's inner surface, and further to cause the viscous membranes to fuse with the separation sheet; and
    cooling the mold to cause the molten resins to harden and form respective portions of the product in the shape of the respective portions of the mold cavity, and further to form fusion bonds between the respective portions of the product and the separation sheet, thereby to form a molded product having a unitary structure.

2. A method according to claim 1, wherein the rotational mold includes mold parts forming the mold cavity therebetween, and the positioning step includes inserting the separation sheet into a groove in at least one of the mold parts.

3. A method according to claim 2, wherein each mold part has a groove for receiving a peripheral edge portion of the separation sheet.

4. A method according to claim 3, wherein the groove is continuous around the mold cavity.

5. A method according to claim 1, wherein the separation sheet is a plastic sheet.

6. A method according to claim 5, wherein the separation sheet is made of at least one of HDPE, MDPE, LLDPE, ABS, PS, PP, PVC, and mixtures thereof, and the resins are at least one of HDPE, MDPE, LLDPE, ABS, PS, PP, PVC, and mixtures thereof.

7. A method according to claim 1, wherein the separation sheet is 0.100-0.125 inches thick.

8. A method according to claim 1, wherein the mold is rotated about two axes of rotation.

9. A method of rotational molding comprising:
    providing a mold for a product to be molded;
    inserting a separation sheet into the mold, wherein the separation sheet has a first side and a second side opposite the first side;
    pouring a first resin having a first color into the mold adjacent the first side of the separation sheet;
    pouring a second resin having a second color different from the first color into the mold adjacent the second side of the separation sheet; and
    molding the product, wherein the first resin and the second resin do not mix during the molding process and wherein the separation sheet becomes an integral part of the product after molding.

10. The method of claim 9, wherein the step of molding the product comprises:
    maintaining the integrity of the separation sheet until such time as the first resin and the second resin have coated the mold, wherein the first and second colors are separated within the mold without mixing;
    melting the separation sheet; and
    dispersing the separation sheet within the mold while maintaining the color separation.

* * * * *